United States Patent
Wehage et al.

(10) Patent No.: US 7,491,276 B2
(45) Date of Patent: *Feb. 17, 2009

(54) PRODUCTION METHOD AND INSTALLATION FOR PRODUCING THIN FLAT PRODUCTS

(75) Inventors: Harald Wehage, Isenburg (DE); Ulrich Skoda-Dopp, Duisburg (DE); Michael Breuer, Hilchenbach (DE); Joachim Hafer, Siegen (DE)

(73) Assignee: SMS Demag AG, Düsseldorf (DE)

( * ) Notice: Subject to any disclaimer, the term of this patent is extended or adjusted under 35 U.S.C. 154(b) by 213 days.

This patent is subject to a terminal disclaimer.

(21) Appl. No.: 10/343,580

(22) PCT Filed: Jul. 21, 2001

(86) PCT No.: PCT/EP01/08444

§ 371 (c)(1),
(2), (4) Date: May 23, 2003

(87) PCT Pub. No.: WO02/11915

PCT Pub. Date: Feb. 14, 2002

(65) Prior Publication Data

US 2003/0178110 A1    Sep. 25, 2003

(30) Foreign Application Priority Data

Aug. 5, 2000    (DE) .............................. 100 38 292

(51) Int. Cl.
*C21D 8/02*    (2006.01)

(52) U.S. Cl. ..................... 148/541; 148/546; 148/602; 148/603

(58) Field of Classification Search ............... 148/541, 148/546, 602, 653, 603
See application file for complete search history.

(56) References Cited

U.S. PATENT DOCUMENTS 6,527,882 B1 * 3/2003 Wehage et al. ............. 148/541

FOREIGN PATENT DOCUMENTS

DE    197 58 108 C1    1/1999

(Continued)

OTHER PUBLICATIONS

Streisselberger A: "Verfahren Der TM-Behandlung MIT Beschleunigter..." Stahl Und Eisen, vol. 111, No. 5, May 15, 1991, pp. 65-73, 164.

(Continued)

*Primary Examiner*—Sikyin Ip
(74) *Attorney, Agent, or Firm*—Friedrich Kueffner

(57) ABSTRACT

The invention relates to a production method for producing, on a production installation (1), flat products, also of a large width, from continuously cast slabs having a large or medium thickness or from thin slabs. Said production installation is comprised of a single or multiple stand blooming train (4), of a roller table (3), which is provided for conveying the rolling stock and, optionally for oscillating, of a roller table section (5) with hinged heat-insulating covering hoods. The production installation is also comprised of a straightening unit (6) for straightening the pre-strips, of an, in particular, inductive heating installation (7) for effecting the controlled heating of the pre-strips to a defined temperature over the length and width of the pre-strips, of a multiple-stand finishing train (10), of a delivery roller table with devices (11) for cooling the hot rolled strip, and of subsequently arranged coiling machines (12) for coiling the finished strip. In the single or two-stand blooming train (4), one or more slabs comprised of carbon steels having an average carbon content of approximately 0.2 to 0.8% or of alloyed case hardening steels or heat-treatable steels are rolled on the roller table (3) to form one or more pre-strips. Said rolling is carried out in two stages with a pause between the same for effecting an intermediate cooling by oscillation. The pre-strips are heated over the length and width thereof to a defined temperature by the combined action of the covering hoods and heating installation, and are rolled in a multiple-stand finishing train (10) in the two-phase region in order to form thin high-strength finished strips.

7 Claims, 4 Drawing Sheets

FOREIGN PATENT DOCUMENTS

| EP | 0823294 | | 2/1998 |
|----|---------|---|--------|
| WO | 99/30847 | * | 6/1999 |

OTHER PUBLICATIONS

Sörgel G: "Rechnergeführtes Thermomechanisches Walzen In Grobblechstrassen" Stahl Und Eisen, vo. 107, No. 20, Oct. 5, 1987, pp. 921-926, 82-926.

Wehage H et al: "Entwicklungstrends Beim Warmflachwalzen Und . . . " Stahl Und Eisen, vol. 118, No. 10, Oct. 14, 1998, pp. 37-44, 139.

Ginzberg V B et al: "Heat Conservation Between Roughing and Finishing . . . " Iron and Steel Engineers, vo. 63, No. 4, Apr. 1, 1986, pp. 29-39.

* cited by examiner

PRODUCTION METHOD AND INSTALLATION FOR PRODUCING THIN FLAT PRODUCTS

The invention pertains to a production method for producing thin, flat products of high strength, including products of considerable width, which have been semi-hot rolled in the two-phase region from continuously cast slabs of large or medium thickness or from thin slabs on an installation consisting of a single or multi-stand blooming train; of a roller table for transporting the rolling stock and for oscillating it; of a roller table section with hinged, heat-insulating hoods; of a straightening unit for straightening the pre-strip; of an inductive heating system for the controlled heating of the pre-strip to a defined temperature along the length and across the width of the pre-strip; of a multi-stand finishing train; and of a delivery roller table with devices for cooling the hot strip, followed by coiling machines for coiling the finished strip, where one or more slabs of carbon steel with a medium carbon content of approximately 0.2-0.8% or of alloyed case-hardening or heat-treatable steel are rolled in the single-stand or multi-stand blooming train in two stages with a pause between the stages to allow for intermediate cooling by oscillation on the roller table to obtain one or more pre-strips, and where the pre-strips are heated to a defined temperature over the length and width by the combined effect of hoods and an inductive heating system and rolled in a multi-stand finishing train in the two-phase region to obtain thin finished strips of high strength.

The invention also pertains to a production installation for producing thin, flat products of high-strength which have been hot-rolled in the two-phase region from continuously cast slabs of large, medium, or small thickness, consisting of a single-stand or multi-stand blooming train with a coverable roller table, of a straightening unit, of an inductive heating system, of a multi-stand finishing train, and of a delivery roller table with a device for cooling the finished strips, followed by coiling machines for coiling the finished strips.

To produce hot-rolled strips, slabs with a thickness of greater than 150 mm or thin slabs with thicknesses between 40 and 150 mm are used as starting material.

In the case of individual slabs of large or medium thickness, the rolling mills usually consist of a single-stand or a multi-stand blooming train, in which the slabs are reduced over the course of several passes in reversing mode, and a multi-stand finishing train or a Steckel stand. The blooming train is designed in terms of capacity so that the continuously cast slabs can be rolled out in a single rolling stage at tapping temperatures of 1,250-1,050° C. to obtain pre-strips. The distances between the heating furnace and the one or more stands of the blooming train and between the blooming train and the finishing train are designed for the rolling of individual slabs in reversing mode; that is, enough space is provided to allow the rolling stock to exit freely. If a coilbox is provided in front of the finishing train to coil the pre-strip, the distance between the stand or the stands of the blooming train and the finishing train can be reduced. An approximately uniform temperature over the length of the hot strip is achieved either by means of a coilbox between the blooming train and the finishing train, by means of sections of the roller table which are covered by thermal insulation hoods, by means of a speed-up in the finishing train, or by means of hot boxes in front of and behind the Steckel stand. In these cases, the process is discontinuous; that is, the blooming train and the finishing train usually operate independently of each other and roll individual slabs. The rolling in the blooming train occurs with in a single stage.

In the case of thin slabs, a distinction can be made between rolling mills which roll slabs with thicknesses in the range of 40-65 mm and those which roll slabs with thicknesses of more than 65 mm as starting material. The former consist of a multi-stand finishing train, a delivery roller table with devices for cooling the hot strip to coiling temperature, and coiling machines for coiling the hot strip. Rolling is carried out in a single stage. Because of the greater deformation work required to arrive at the same final thickness, the installations for thin slabs with a thickness of more than 65 mm consist of a single- or multi-stand blooming train for one or more rolling passes in the direction of the end of the installation, a multi-stand finishing train, a delivery roller table with devices for cooling the hot strip to coiling temperature, and coiling machines for coiling the hot strip. Between the blooming train and the finishing train are devices for cooling or heating and/or for coiling the pre-strip, which ensure the necessary temperature for entry into the finishing train. If the blooming train and the finishing train are working in concert, rolling occurs in a single rolling stage. If the blooming train and the finishing train are working independently, a single rolling stage is carried out in each train.

The rolling installations described above are usually laid out and operated in such a way that the deformation produced by the individual passes occurs in the fully austenitic region in both the blooming train and the finishing train for all steels; or, in the case of low-carbon steels, it is carried out so that the deformation occurs in the mixed austenitic-ferritic region in the finishing train or, for deeply decarburized steels, in the austenitic-ferritic or in the pure ferritic region.

In the case of austenitic rolling, the rolling temperature is above the GOS line of the iron-carbon diagram during all passes. To achieve a fine-grained structure, the final rolling temperature in the final stands of the finishing train is just above the GOS line.

In the case of austenitic-ferritic rolling (two-phase region) of low-carbon steels with carbon contents of 0.03-0.07%, the rolling temperature in the last stand or in all stands of the finishing train is below the GOS line, i.e., in the range of approximately 810-890° C. This can be achieved by lowering the furnace outlet temperature of the slabs from approximately 1,250° C. to approximately 1,050° C., as a result of which the percentage of the microalloying elements present in solution decreases, and the quality of the hot strip is reduced. It is also possible to reduce the rolling speed without lowering the furnace outlet temperature, as a result of which the rolling stock is cooled to a greater extent. The disadvantage here is that production is decreased, and a larger temperature difference is created between the head of the strip and the tail. The two measures can also be combined, in which case both disadvantages occur.

When deeply decarburized steels are subjected to ferritic rolling, the lowering of the final rolling temperature to at least 720° C. is achieved by the measures already mentioned for austenitic-ferritic rolling. The disadvantages are also the same.

The cooling from the austenitic temperature range into the two-phase region or into the ferritic temperature region can be accomplished with water between the passes, as a result of which the edges of the strip are cooled to a greater extent, which negatively affects the uniformity of the quality across the width of the strip. When the blooming train and the finishing train are operating independently, it is also possible, for example, to cool the strip with air by oscillating it on the roller table between the blooming train and the finishing train. During this time, it is usually not possible to roll any strip in the blooming train, because the oscillated pre-strip to be cooled is occupying the roller table between the blooming train and the finishing train. Production is therefore low.

In the case of austenitic-ferritic and ferritic rolling, the low temperatures are not reached until the last two or three rolling passes, as a result of which the thickness reduction in the target temperature range is small. The structural transformation point is within the finishing train and shifts from one stand to another as a result of temperature effects. This leads to dips in the rolling force as a result of the lower deformation resistance of the material after the transition to the ferritic temperature range. This is disadvantageous for the roll bending and roll adjusting systems used to guarantee the thickness, profile, contour, and flatness of the finished strip, because these systems use the measured rolling force as an output signal.

Because the structural transformation of austenite to ferrite is a function of time, some of the passes will always be in the two-phase austenite/ferrite region. Because of the loads which the stands and drive systems can be allowed to absorb, the rolling of thin finished strips according to this technology is limited to low-carbon and deeply decarburized steels with a low total deformation resistance.

When carbon steels with intermediate carbon contents of approximately 0.2-0.8% C and alloyed case-hardening and heat-treatable steels are rolled in the two-phase region, structures and mechanical properties are obtained which correspond almost completely to the heat-treated state. Very high tensile strength and yield stress values (>1,000 N/mm$^2$) are achieved. In comparison to the low-carbon and deeply decarburized steels, these steels, however, are characterized by much higher deformation resistances.

The transformation starting temperatures of these steels are also lower, that is, in the range of 830-730° C., depending on the chemical composition. Whereas the transformation point shifts to lower temperatures as the preheating temperature increases, an increase in the degree of deformation during rolling in the austenitic region causes the transformation point to shift to higher temperatures. The same is also true for the temperatures of the end of transformation. The two-phase region of these steels is in the temperature range of 830-630° C., depending on their chemical composition. As the temperature decreases, the deformation resistance increases. The extent to which the deformation resistance drops when these steels are below the transformation starting temperature is much less pronounced than in the case of the low-carbon or deeply decarburized steels and in some cases it does not drop at all.

For this reason, it is impossible to conduct the semi-hot rolling of thin strips of carbon steels with medium carbon contents or of case-hardening and heat-treatable steels with a total reduction of 50-80% in the two-phase region on industrial installations for wide strip (>1,250 mm) according to the current state of the art without exceeding the allowable loads on the stands and drive systems.

Against the background of this state of the art, the task of the invention is to create a production method and a production installation for the semi-hot rolling of thin strip of carbon steels with medium carbon contents and of alloyed case-hardening and heat-treatable steels in the two-phase austenite/ferrite region, by means of which the previously mentioned disadvantages and problems are eliminated and the technologies known according to the current state of the art can be realized.

The production method is especially designed for the rolling of thin strip of carbon steel with medium carbon contents and of alloyed case-hardening and heat-treatable steels of high strength in the two-phase region, but it also makes possible the technologies of austenitic rolling and austenitic-ferritic and ferritic rolling of low-carbon and deeply decarburized steels.

With this production installation, continuously cast slabs even of considerable width can be rolled in a single- or multi-stand blooming train in two stages with a pause between them for intermediate cooling by oscillation on the roller table to obtain one or more pre-strips; the pre-strips can be heated by the combined action of thermal insulation hoods and an inductive heating system to a defined temperature over the length and width and rolled in a multi-stand finishing train in the two-phase region to obtain thin finished strips of high strength.

Depending on the situation, one or two two-high or four-high stands designed for the rolling of pre-strips of considerable width at low temperatures are required for the blooming train. Four-high and/or six-high stands designed for the rolling of finished strips of considerable width in the two-phase region are required for the finishing train. The stands are equipped with the actuators and automatic control circuits required to control the temperatures effectively for hot and semi-hot deformation operations and to guarantee the required tolerances of the finished product with respect to thickness, profile, flatness, and the various material and mechanical properties.

So that the rolling temperature in the blooming train can be controlled effectively, roller tables with separately driven, synchronized table sections are required downstream from the single- or two-stand blooming train. So that the rolling temperature in the finishing train can be controlled effectively, a roller table section with hinged, thermally insulating cover hoods and an induction system are required upstream from the finishing train.

The invention is described below on the basis of a schematic diagram of a production installation, which is illustrated in FIGS. 1-4 of the drawing.

The production installation consists of a casting machine 15 for producing continuously cast slabs or large or medium thickness or thin slabs; a shear 14 for cutting the cast strand into slabs; a furnace 13 for preheating the continuously cast slabs, which can be used cold or hot, or for equalizing the temperature of thin slabs at the value required for the start of rolling; descaling sprays 2 for descaling the heated or temperature-equalized continuous cast slabs; a roller table 3 for transporting the slabs or the rolling stock in the rolling direction and for oscillating intermediate strips during the intermediate cooling stage; a single- or two-stand blooming train 4 for rolling out the continuous cast slabs into pre-strips over the course of at least two rolling stages; a roller table area 5, equipped with hinged, thermally insulating hoods; a straightening unit 6 for straightening the pre-strips; an inductive heating system 7 for the controlled heating of the pre-strips to a defined temperature over the length and width of the strip; a shear 8 for trimming or chopping the heads of the pre-strip; descaling sprays 9 for descaling the pre-strips; a multi-stand finishing train 10 for rolling out the pre-strips into finished strips; a delivery roller table with a device for cooling 11 the rolled, finished strips; and one or more coiling machines 12 following the finishing train for coiling the finished strip.

The course of the rolling process begins with the drawing of a slab, which has been heated to an upper austenite temperature or a slab with an equalized temperature, out of the furnace 13 and the descaling of the slab surface by means of the descaling sprays 2.

The slab is then rolled in the blooming train 4 in a first deformation stage, after which the intermediate strips are cooled by oscillation on roller table sections 3 in front of 3 and/or behind 5 the blooming train to a temperature near the upper GOS line of the iron-carbon diagram, that is, to a point just above the starting temperature of the transformation of austenite to ferrite. According to the invention, the intermediate strips are then rolled out into pre-strips in a second deformation stage on the blooming train 4, for which the rolling temperature is just above the transformation starting temperature.

It is preferable to roll carbon steels, alloyed case-hardening and heat-treatable steels of high strength in the first deformation stage with a total reduction of 40-70% and in the second deformation stage with a total reduction of 60-80% at high deformation resistances.

As a result, the first deformation stage leads to the transformation of the structure of the cast strand into a rolled structure by complete recrystallization, whereas the second deformation stage leads to the adjustment of a fine-grained, partially strengthened structure of grain classes 6-10 according to DIN 50,601.

As a result of the second deformation stage according to the invention, the transformation starting temperature of the rolling stock is raised before the stock is rolled in the finishing train 10, and the transformation rate is also accelerated, which promotes the rolling of thin strips, because the deformation resistance first decreases at the transition from austenite to ferrite and then usually rises again as the deformation temperature decreases.

It is preferable to optimize the starting temperature of the second deformation stage in the blooming train 4, the pause time between the first and the second deformation stage, and the total rolling time of the second deformation stage in such a way that there is no need for an additional pause to allow intermediate cooling by oscillation as the pre-strip is being transported from the blooming train to the finishing train. During the pause for intermediate cooling between the first and second deformation stages, the hinged, thermally-insulating cover hoods 5 are raised, so that the intermediate strips can cool freely in the air as they oscillate on the roller table.

Depending on the thickness and length of the pre-strip, on the thickness of the finished strip, on the rate of entry into the finishing train 10, and on the cooling effect of the descaling sprays 9 in front of the finishing train, the pre-strip is heated uniformly over its length and width by the combined action of the closed hoods 5 and the inductive heating device 7 to a target temperature such that the rolling in the finishing train 10 occurs in the two-phase region during all the passes.

During the rolling in the second deformation stage in the blooming train, an upward or downward "ski" can occur at the head and/or at the tail of the pre-strip, which is promoted by rolling at temperatures just above the transformation starting temperature. Before the pre-strips enter the inductive heating device 7, the ends of the pre-strip are straightened in a straightening unit 6.

FIGS. 2 and 3 of the drawing show how the temperatures at the head 1, in the center 2, and at the tail 3 of the strip change during the rolling process over the course of the entire installation. For thin strips in the upper thickness range, only the heat-insulating cover hoods are used, i.e., lowered (FIG. 2), to arrive at a uniform rolling temperature in the finishing train over the length of the strip. The inductive heating device can be used to reheat the edges. For thin strips in the lower thickness range, both the lowered, heat-insulating cover hoods and the inductive heating device are used (FIG. 3) to arrive at a uniform rolling temperature over the length and the width in the finishing train.

Rolling in the finishing train is preferably conducted in the two-phase region for all passes with a total reduction of 50-80%, as a result of which high strength values of more than 1,000 N/mm² can be achieved for carbon steels with medium carbon contents, for alloyed case-hardening steels, and for heat-treatable steels.

According to the invention, it is possible to roll one or more slabs into intermediate strips during the intermediate cooling pause between the first and the second deformation stage in the blooming train. FIG. 4 shows the chronological order of the interleaved sequences in which several slabs or strips can be rolled.

A multiple of the total time required for the second deformation stage in the blooming train, for the transport of the pre-strip to the finishing train, and for the rolling in the finishing train, which is shorter than the pause between the first and the second deformation stage in the blooming train, determines the number of slabs which can be rolled in immediate succession in the blooming train in the first deformation stage with open hoods and oscillated downline from the blooming stand for intermediate cooling on the roller table.

It is preferable for the intermediate strips, except for the first, which are cooling after the first deformation stage in the blooming train, to be moved either as a group or individually in succession from their position on the roller table behind the blooming stand to a position on the roller table in front of the blooming stand without a reducing pass to allow them to continue to cool by oscillation and then for the first intermediate strip to be rolled in the second deformation stage on the blooming stand, after which the other intermediate strips are rolled after having cooled for the same amount of time (FIG. 4).

Separately driven, synchronized groups of roller tables are provided behind and in front of the blooming stand to oscillate the intermediate strips for their intermediate cooling.

After rolling in the two-phase region in the finishing train has been completed, the finished strips are cooled on the delivery roller table in a device which cools them to a defined coiling temperature, as a result of which the favorable combination of mechanical properties achieved during rolling are preserved or even qualitatively enhanced.

Production Installation

Figure 1:
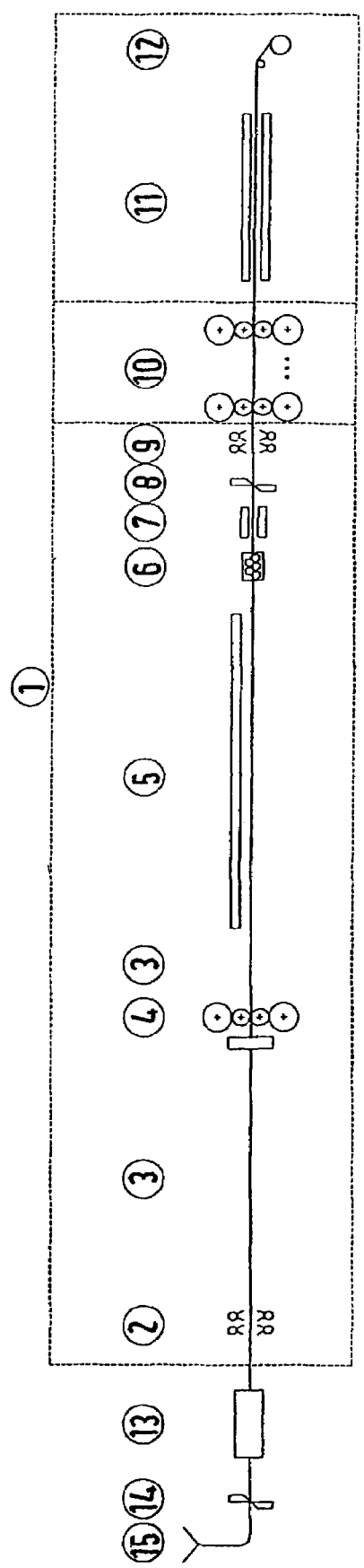
FIG. 1.
Figure 2:
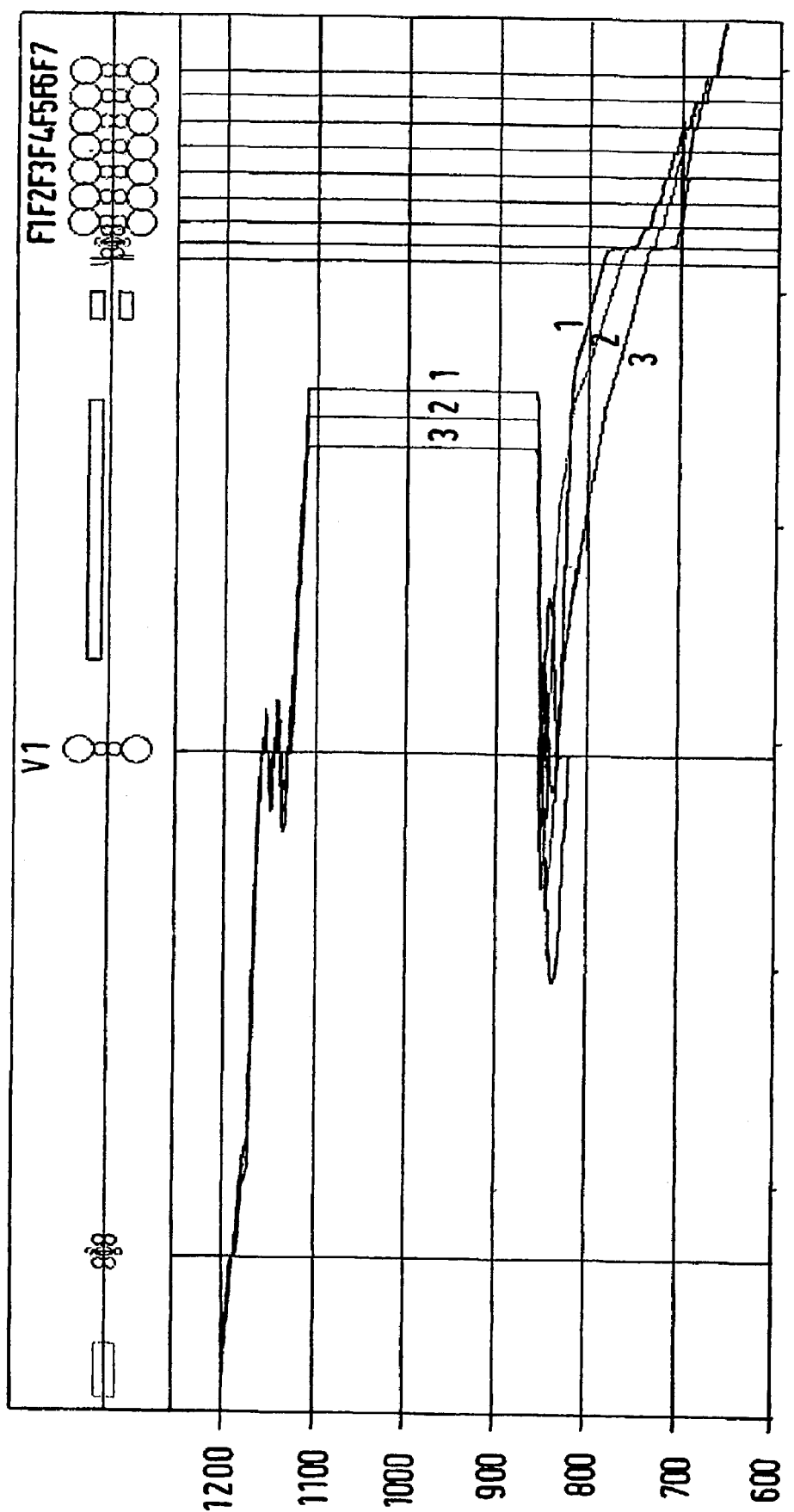
Figure 3:
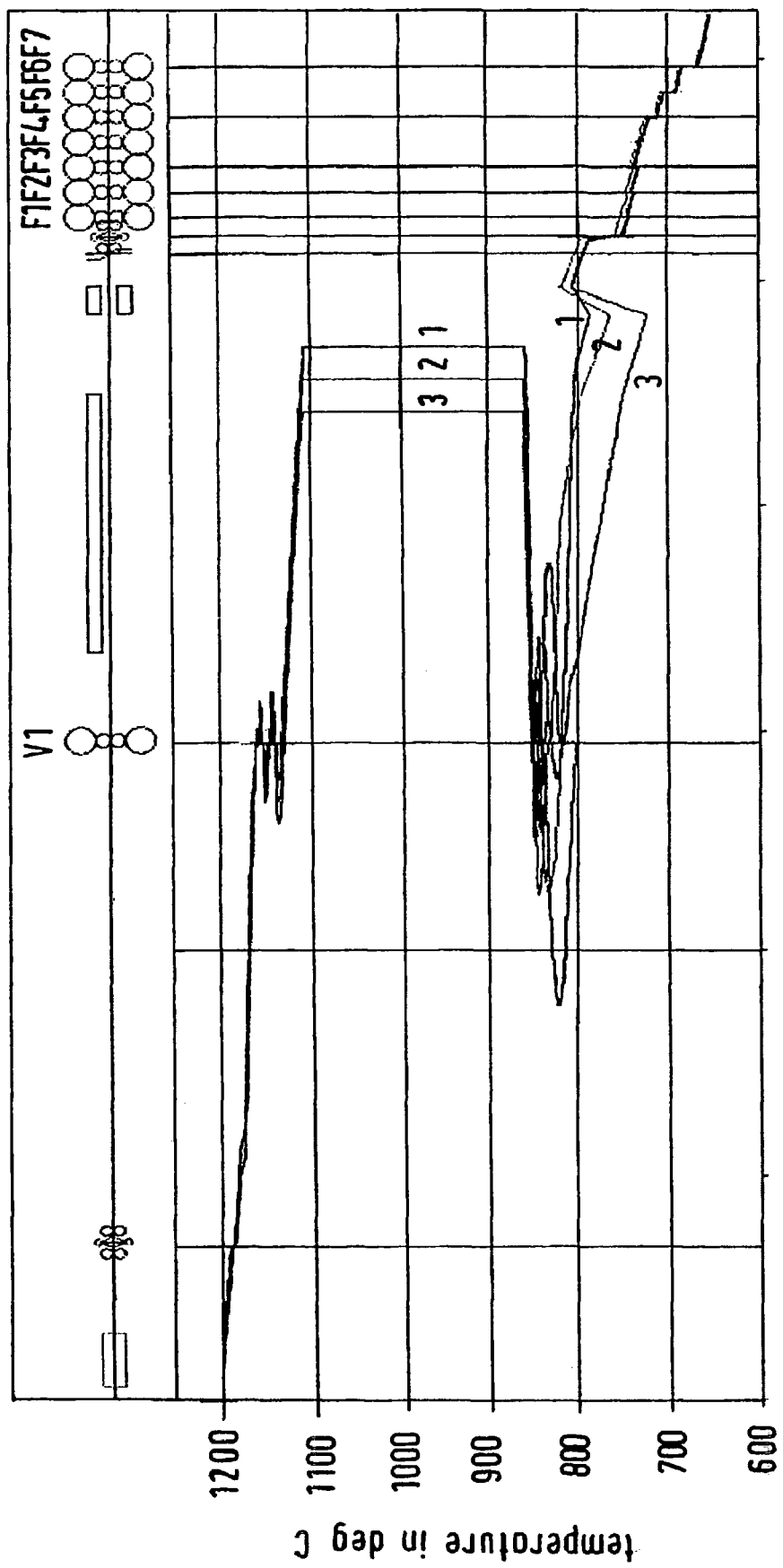
Figure 4:
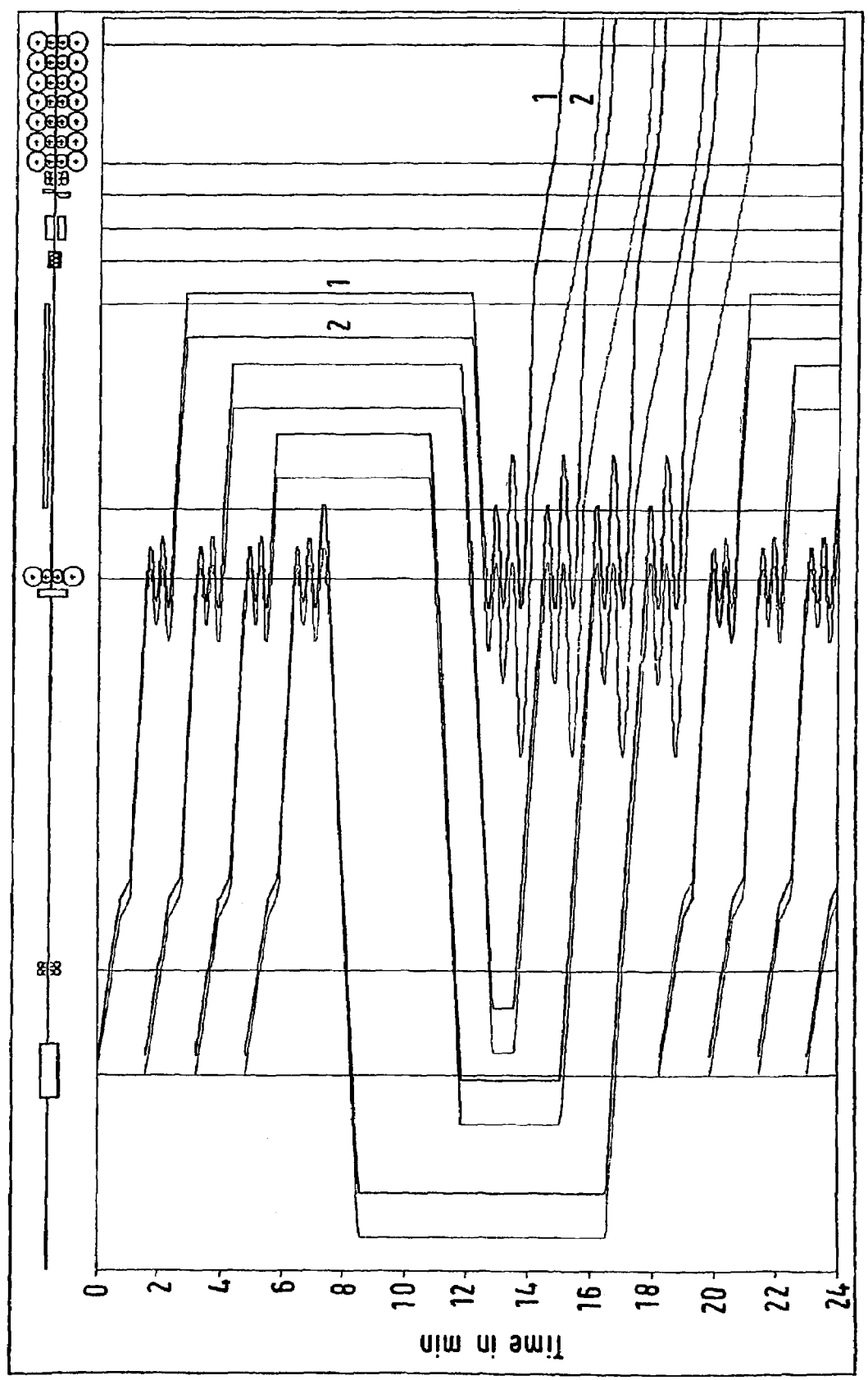

1 production installation for the semi-hot rolling of high-strength, thin, flat products in the two-phase region
2 descaling sprays
3 roller table
4 blooming train with one or two stands
5 roller table section with hinged, thermally insulating hoods
6 straightening unit
7 inductive heating system
8 shear
9 descaling sprays
10 multi-stand finishing train
11 device for cooling the finished strip
12 coiling machine
13 preheating or temperature-equalizing furnace
14 shear
15 casting machine

FIG. 2:

Temperature Curve of Two-Phase Rolling without Inductive Heating the Pre-Strip over the Length of the Pre-Strip
1 temperature curve of the head of the strip
2 temperature curve of the middle of the strip
3 temperature curve of the tail of the strip

FIG. 3:

Temperature Curve of Two-Phase Rolling with Inductive Heating of the Pre-Strip over the Length of the Pre-Strip
1 temperature curve of the head of the strip
2 temperature curve of the middle of the strip
3 temperature curve of the end of the strip

FIG. 4:

Time Diagram of Multi-Slab Rolling
1 time curve for the head of the first strip
2 time curve for the tail of the first strip

The invention claimed is:

1. An improved method for producing thin, flat steel products from continuously cast slabs in an installation having a single-stand or multi-stand blooming train, a roller table for transporting the rolling stock and optionally for oscillating it, a roller table section having hinged, heat-insulating hoods, an inductive heating device for controlled preheating of the pre-strip to a defined temperature over the length and the width of the pre-strip, a multi-stand finishing train, a delivery roller table with devices for cooling the hot strip, and downstream coiling machines for coiling the finished strip, wherein a fine-grained structure of grain classes 6-10 according to DIN 50,601 is produced by a total reduction of up to about 80% in order to achieve high strength values, the improvement comprising the steps of:

rolling at least one slab of carbon steel with a medium carbon content of approximately 0.2-0.8% or alloy case-hardened or heat-treatable steel in the single-stand or multi-stand blooming train in a first deformation stage and a second deformation stage with a pause between the stages to allow for intermediate cooling by oscillation on the roller table to obtain one or more pre-strips, the rolling step including setting the rolling temperature of the first stage in the blooming train, which is in the upper austenite region, at a total reduction of 40-70%, to the transformation of the structure of the cast strand to a rolled structure by complete recrystallization;

heating the pre-strips to a defined temperature over the length and width by a combined action of the heat-insulating hoods and the inductive heating device; and rolling the heated pre-strips in a multi-stand finishing train in the two-phase region to obtain reduced-thickness finished strips, wherein in the first rolling the transformation starting temperature of the transition to the two-phase region is raised and the transformation time decreased by the fine-grained and partially strengthened structure in order to lower the deformation resistances in the finishing train, the heating step including adjusting the pre-strip uniformly during the first rolling, depending on the thickness and length of the pre-strip, on the thickness of the finished strip, on the entry speed into the finishing train, and on the cooling effect of descaling sprays in front of the finishing train, to a target temperature along its length and across its width by the combined effect of the closed hoods and the inductive heating device so that the rolling in the finishing train occurs in the two-phase region during all passes, the rolling in the finishing train including reversing passes of the strip without a protective atmosphere, the rolling further taking place without a reheating of the edges of the strip.

2. The method according to claim 1, further including optimizing the starting temperature of the second deformation stage, the pause between the first and the second deformation stage in the blooming train, and the total rolling time of the second deformation stage in such a way that, during transport of the pre-strip from the blooming train to the finishing train, no additional pause is required for intermediate cooling by oscillation to the entry temperature of the pre-strip into the finishing train.

3. The method according to claim 1, including determining the number of slabs which can be rolled in the blooming train in the first deformation stage in immediate succession with open hoods and which can be oscillated on the roller table behind the blooming stand for the purpose of intermediate cooling from a multiple of the total time for the second deformation stage in the blooming train, for transport of the pre-strip to the finishing train, and for the rolling in the finishing train, which is shorter than the pause between the first and the second deformation stage in the blooming train.

4. The method according to claim 1, further including the step of moving the intermediate strips, except for the first intermediate strip, cooling after the first deformation stage in the blooming train after the end of the intermediate cooling time of the first intermediate strip either as a group or individually in succession from their position on the roller table behind the blooming stand to a position on the roller table in front of the blooming stand without a reducing pass to allow them to continue to cool by oscillation, whereupon the first intermediate strip is rolled in the second deformation stage on the blooming stand, and then the other intermediate strips are treated after having cooled for the same amount of time.

5. The method according to claim 1, including oscillating the intermediate strips during the intermediate cooling phase behind and in front of the blooming stand with separately driven, synchronized groups of roller tables.

6. The method according to claim 1, including cooling the finished strip rolled in the two-phase region in the finishing train on the delivery roller table to a defined coiling temperature in order to preserve or qualitatively to enhance the combination of mechanical properties achieved during rolling.

7. The method according to claim 1, including the austenitic, austenitic-ferritic, and ferritic rolling of low-carbon and deeply decarburized steels.

* * * * *